(No Model.)

W. N. WHITELEY.
Harvester Chain Rake.

No. 239,003. 4 Sheets—Sheet 1.

Patented March 15, 1881.

Attest:
R. F. Barnes.
L. M. Marshall.

Inventor:
Wm. N. Whiteley
By his atty
R. D. Smith (No Model.)  W. N. WHITELEY.  4 Sheets—Sheet 2.
Harvester Chain Rake.
No. 239,003.  Patented March 15, 1881.

(No Model.) 4 Sheets—Sheet 3.
W. N. WHITELEY.
Harvester Chain Rake.
No. 239,003. Patented March 15, 1881.
Fig. 3.
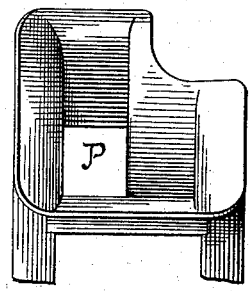
Fig. 4.
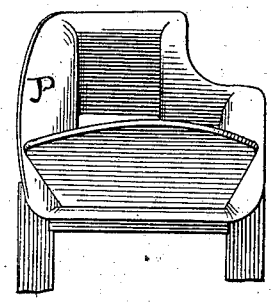
Fig. 5.
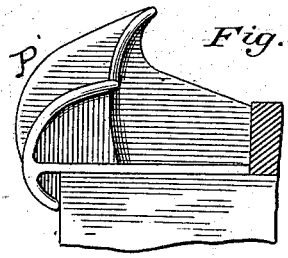
Fig. 6.
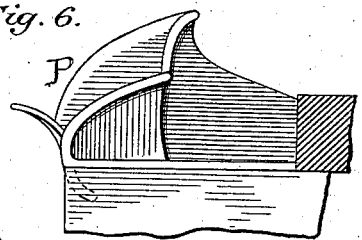
Fig. 7.
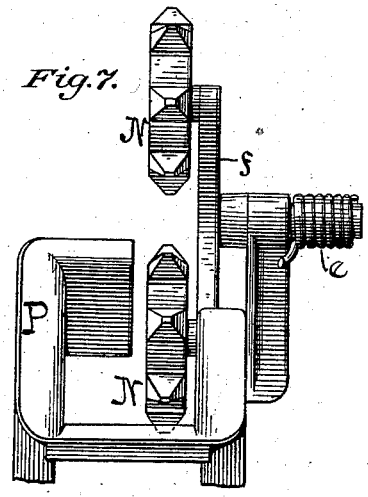
Fig. 8.
Fig. 9.
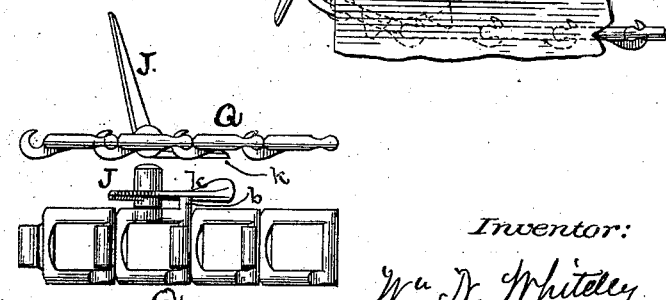
Attest:
R. F. Barnes.
L. H. Marshall.
Inventor:
Wm. N. Whiteley
By his Atty
R. A. O. Smith (No Model.) 4 Sheets—Sheet 4.

W. N. WHITELEY.
Harvester Chain Rake.

No. 239,003. Patented March 15, 1881.

Attest:
R. F. Barnes.
L. H. Marshall.

Inventor:
Wm. N. Whiteley
By his atty
R. D. O. Smith

UNITED STATES PATENT OFFICE.

WILLIAM N. WHITELEY, OF SPRINGFIELD, OHIO.

HARVESTER CHAIN-RAKE.

SPECIFICATION forming part of Letters Patent No. 239,003, dated March 15, 1881.

Application filed May 7, 1880. (No model.)

*To all whom it may concern:*

Be it known that I, WILLIAM N. WHITELEY, of Springfield, in the county of Clarke and State of Ohio, have invented a new and useful Improvement in Chain-Rakes; and I do hereby declare that the following is a full and exact description of the same.

My invention relates to that class of chain-rakes known as "falling-tooth," wherein the teeth which constitute the rake are hinged to the chain or belt, so that they stand upright while advancing across the platform and lie down while returning; and it consists, in general terms, in the manner of mounting the falling tooth and in guiding and controlling the rake-chains.

That others may fully understand my invention, I will particularly describe the structure and mode of operation, having reference to the accompanying drawings, wherein—

Figure 1:
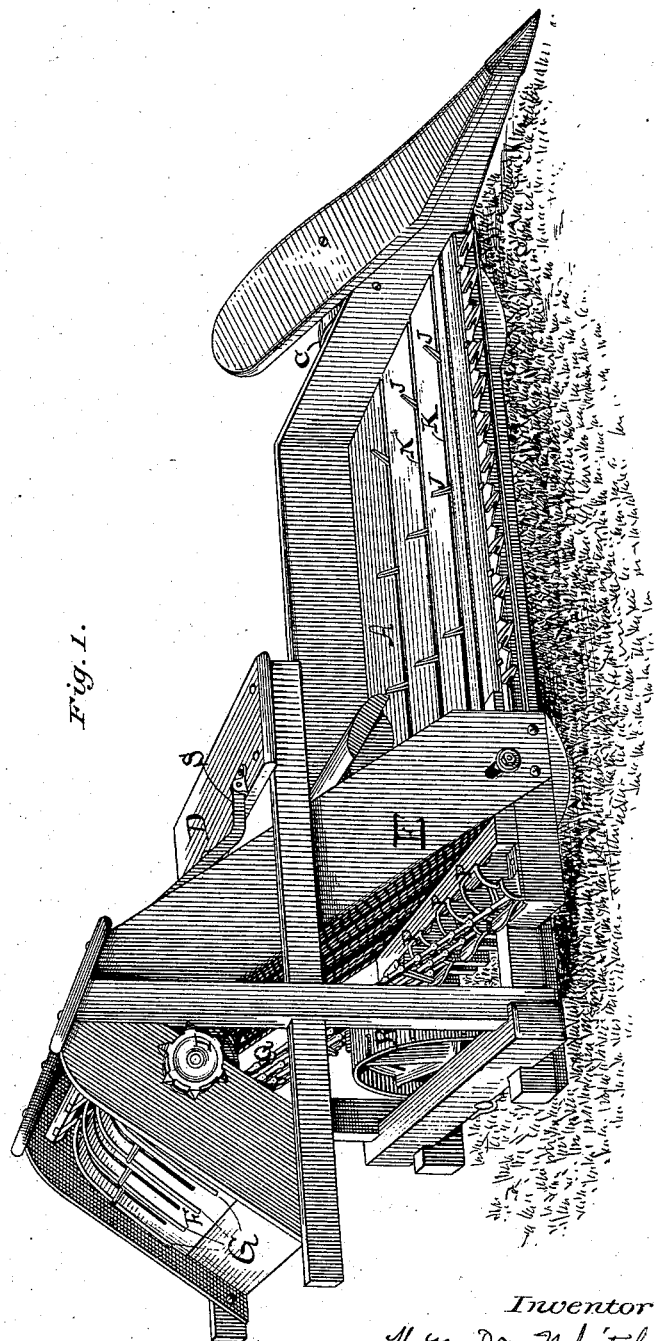
Figure 2:
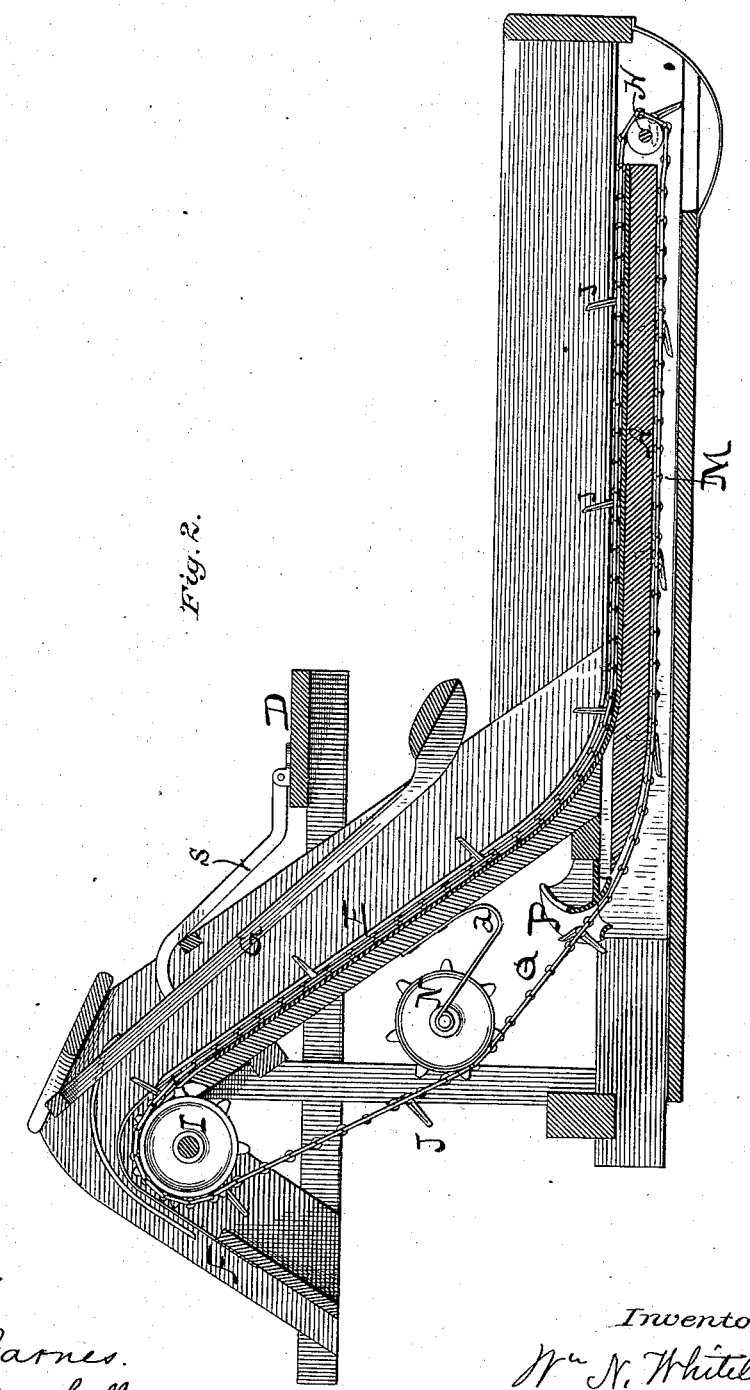
Figure 10:
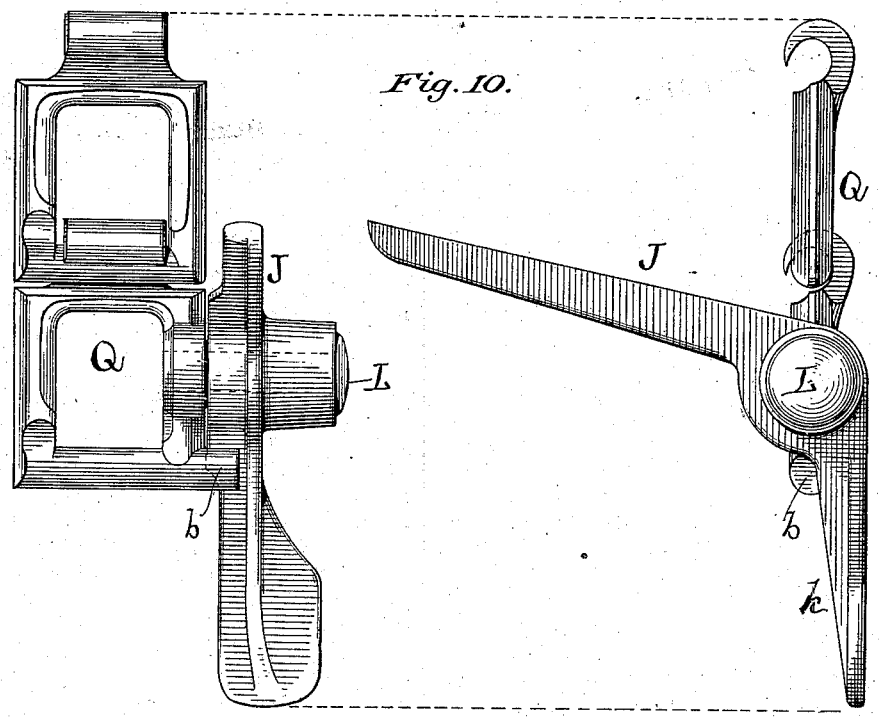
Figure 11:
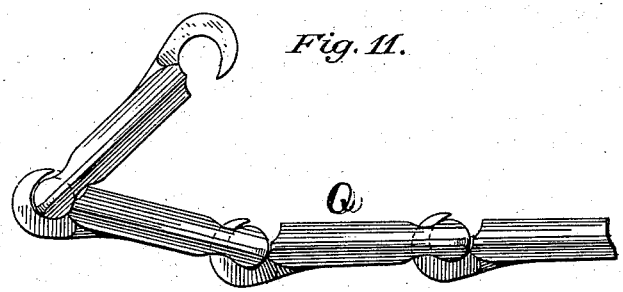

Figure 1 is a perspective view of my machine. Fig. 2 is a longitudinal section of the same. Figs. 3, 4, 5, and 6 are views of the chain-guide. Figs. 7 and 8 are views, in front and side elevation, of the chain-tighteners. Fig. 9 is a plan and elevation of a section of chain with the tooth attached. Figs. 10 and 11 are details of the same enlarged.

A is the frame of my machine. It is constructed in the usual way, and is supported at one end upon the main wheel B, and at the other end upon the grain-wheel C.

The elevator-frame E is mounted upon the inner end of the frame A, and spans the main wheel, as usual. At the outer side of the elevator the grain is delivered on a chute, F, and from thence it may pass to a receptacle for automatic binding, or to a binder's table, or be disposed of in such other way as may be desired.

Above the elevator there are wind-rods G, as usual, to prevent the wind from raising the grain off the elevator-teeth. The wind-rods also keep the grain well down upon the elevator. They are suspended, and to some extent balanced, upon the arms S, which are pivoted to the foot-board D.

The conveyer-chains Q, I prefer to make continuous across the platform and up the elevator, so that when the cut grain has been once engaged by it it will not be released until it is delivered to the chute F. Said chains are as many in number as may be desired. They are parallel with each other and are supported upon the end rollers, H I, the former of which is at the outer end of the frame and the latter at the top of the elevator E. The chains or belts Q run beneath the platform and carry the teeth J, which project up through slots K lengthwise across the platform, immediately above the runways, in which the chains are placed and guided.

It is well known that in harvesting-machines it is important that the platform shall not be very thick vertically, because the cutters cannot be brought down close to the ground if the platform is thick. It therefore becomes necessary that the teeth, which stand up and project above the platform while advancing across it, shall fall down and pass back beneath the platform in a recumbent position. I therefore provide pintle or journal pins, which are secured to the chain or belt, and project edgewise therefrom, and mount said teeth upon said pins, as shown in Figs. 9 and 10. The pintles L may be inserted or secured to the chain or belt in any suitable way, though I prefer to make the chain similar to that shown in said figures, and to provide a socket in the edge of the link, and secure the end of the pintle-pin therein by screwing, riveting, or otherwise. The tooth J is made in the form of a bell-crank, and is pivoted at its angle. The lower member or foot, *k*, is made with a broader face than the upper member, and is fitted to slide along the bottom of the guide or runway M, immediately below the platform and beneath the slots K K, so that while the chain is passing along said runway the tooth J is compelled to stand upright by reason of the foot-piece *k* sliding on the bottom of said runway. When, however, the tooth passes over the roller I it is at liberty to assume a position, under the influence of gravity, until it descends to the level of the platform again and enters another runway M, Fig. 2, when the upper member of the tooth encounters said runway, and is thereby pushed over upon its face, and so remains until it reaches the pulley or roller H. In this way the chains and the teeth retreat to the outer end of the platform in a space much less than the height of the tooth. When the chain Q passes over the pulley H it is again brought to an upright position by the engagement of the foot $k$ with the shaft of pulley H, and afterward with the bottom of the runway.

A stop, $b$, projects from the chain or belt, between the upper and lower member of the tooth J, so that the movement of the same upon its pivot L is limited, and the tooth, when left free, as it is between the roller I and the lower runway, cannot turn over to a position which might prevent the proper entrance to the runway.

To restrain the swinging motion which the movement of the machine would impart to the free portion of the chain or belt between the pulley I and the lower runway, and to prevent the obstruction which such motion would present, I place the guide-pulleys N between said roller I and the lower runway. If a chain-belt is employed then said pulley may be provided with sprockets adapted to engage the links of the chain, or the pulley may be constructed with flanges to prevent the belt or chain from running off. I prefer, also, to mount said pulley upon a yielding support, so that it may serve to maintain a certain tension in the chain or belt, and for that purpose the arm upon which the pulley N is mounted is provided with a spring. In Fig. 2 the arm is represented as constructed from a bar of metal, $d$, having the form of a spring and made yielding between its point of rigid attachment to the frame and the journal-bearing of the wheel N. In Figs. 7 and 8 wheel N is mounted upon the end of a pivoted arm, and said arm is given an elastic movement in one direction by a spring, $e$, coiled about the axis or pivot of the pulley-arm $f$. I think it will also be advantageous to place two wheels, N, upon the same arm $f$, one on each side of the axis or pivot-bearing, and pass the chain over said wheels, as shown in Fig. 8, but that will not introduce any new principle of operation.

The guides P P are useful in directing and insuring the proper entrance of the chains to the lower runway. They are metallic hopper-like hollow plates secured to the frame directly in front of the openings to the lower runways, and the external openings of said guides are large enough to permit the unobstructed entrance of the chains under all circumstances.

In Fig. 8 a portion of the top of the guide is cut away to permit the introduction of the lower wheel N, shown therein within the opening of the guide.

Having described my invention, what I claim as new is—

1. The falling tooth, in combination with a stop projecting from the chain-link to prevent said tooth from going too far in either direction.

2. The chain and its falling teeth, combined with the runway M and throat-piece P, for guiding the chain and falling teeth into their proper position on its return.

3. The chain and falling tooth, connected as set forth, and throat-piece P, in combination with a spring-tightening roller.

4. The chain provided with falling teeth, combined with the double-tightening rollers operating in opposite directions for the purpose of taking up the slack of the chain and guiding the same to carry the falling tooth into the lower runway on its return, substantially as shown and described.

5. An endless carrier-chain provided with falling teeth, extending across the platform and up the elevator, the teeth pivoted so as to fall back after leaving the grain upon the chute F, to be delivered as set forth, combined with the throat-piece P, substantially as set forth.

WILLIAM N. WHITELEY.

Witnesses:
E. H. BARNES,
PERCY NORTON.